United States Patent
Hartmann et al.

(10) Patent No.: US 10,152,313 B1
(45) Date of Patent: Dec. 11, 2018

(54) SHARED LIBRARY TRANSFORMATION ON THE SAME ARCHITECTURE

(71) Applicant: International Business Machines Corporation, Armonk, NY (US)

(72) Inventors: Frederik J. Hartmann, Sindelfingen (DE); Ulrich Weigand, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/846,396

(22) Filed: Dec. 19, 2017

(51) Int. Cl.
*G06F 8/51* (2018.01)
*G06F 8/41* (2018.01)

(52) U.S. Cl.
CPC . *G06F 8/51* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 9,081,896 B1 * | 7/2015 | Efremov | G06F 11/3664 |
| 2005/0015758 A1 * | 1/2005 | North | G06F 9/45516 |
| | | | 717/138 |
| 2011/0113409 A1 | 5/2011 | Evans et al. | |
| 2014/0351799 A1 * | 11/2014 | Kosnik | G06F 8/41 |
| | | | 717/140 |
| 2016/0011890 A1 * | 1/2016 | Tan | G06F 8/52 |
| | | | 718/1 |
| 2016/0077850 A1 * | 3/2016 | Andrus | G06F 9/4552 |
| | | | 717/139 |
| 2017/0039050 A1 * | 2/2017 | Eltsin | G06F 11/0712 |
| 2018/0196652 A1 * | 7/2018 | Gschwind | G06F 8/54 |

FOREIGN PATENT DOCUMENTS

CN 105335203 A 2/2016

OTHER PUBLICATIONS

Chow, Alex Chunghen, "Programming the Cell Broadband Engine", Gamasutra, Jul. 21, 2006, 4 pages, <http://www.gamasutra.com/view/feature/130278/programming_the_cell_broadband_.php?page=4>.

* cited by examiner

*Primary Examiner* — Philip Wang
(74) *Attorney, Agent, or Firm* — Daniel C. Housley

(57) ABSTRACT

The invention relates to a method for transforming a shared library between two operating systems with different application binary interfaces (ABIs) on a predetermined instruction set architecture. The shared library is implemented by a source object file comprising at least a source memory image, source symbol information, and absolute source relocation information. The method comprises: creating a target object header compliant to the target ABI and comprising information descriptive of the shared library and/or a target object file; creating a target memory image compliant to the target ABI from the source memory image; creating target symbol information compliant to the target ABI from the source symbol information; creating target relocation information compliant to the target ABI from the source relocation information; and writing the target object header, memory image, symbol information, and relocation information to the target object file to implement the transformed shared library.

20 Claims, 6 Drawing Sheets

SHARED LIBRARY TRANSFORMATION ON THE SAME ARCHITECTURE

BACKGROUND

The present invention relates to software development, and more particularly, to providing object code on different operating systems.

The development of software often takes place on a particular computer system which provides comprehensive support for a contemporary development environment, including current compilers, source code managers, and loaders for current object file formats such as GOFF or ELF. However, the software developed within this environment is sometimes intended to be deployed within the environment of e.g., a legacy operating system, which is not actively developed anymore, e.g., for strategic reasons, but is still used as an essential component (for instance, an administration platform) of contemporary computing systems.

The operating system (OS) under which the new software is being developed features an application binary interface (ABI) which does not match the ABI of the legacy OS where it shall be deployed. For this reason, an object file compliant to the development ABI may be not compliant to the deployment ABI. Additionally, the deployment system may be unsupportive of the current compilers, source code managers and/or object file formats of the development system, so an object file compliant to the target ABI may not be able to be created by compiling the source code on the deployment system without amendments to the source code and/or the deployment system. Therefore, it would be desirable to have a method for transforming an object file from the development operating system to the deployment operating system.

SUMMARY

It is an objective of the present invention to provide for a method, a computer program product and a computer system for transforming a shared library from a source operating system to a target operating system. Embodiments of the invention are given in the dependent claims. Embodiments of the present invention can be freely combined with each other if they are not mutually exclusive.

In one aspect, the invention relates to a method for transforming a shared library from a source operating system to a target operating system. The source operating system comprises a source application binary interface and is executable on a predetermined instruction set architecture. The target operating system comprises a target application binary interface and is executable on the predetermined instruction set architecture, wherein the target application binary interface is different from the source application binary interface. The shared library is implemented by a source object file which is compliant with the source application binary interface and comprises at least a source memory image, source symbol information, and source relocation information, wherein the source relocation information is free from relative relocation information. The method comprises:

creating a target object header which is compliant to the target application binary interface and comprises information descriptive of a shared library and a target object file to be generated by the transformation;

creating a target memory image compliant with the target application binary interface, the target memory image comprising memory image data sourced from the source memory image;

creating target symbol information compliant to the target application binary interface, the target symbol information being sourced from the source symbol information;

creating target relocation information compliant to the target application binary interface, the target relocation information being sourced from the source relocation information; and writing the target object header, the target memory image, the target symbol information, and the target relocation information to the target object file to implement the transformed shared library by the target object file.

In a further aspect, the invention relates to a computer program product implementing the method.

In yet another aspect, the invention relates to a computer system adapted for implementing the method.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
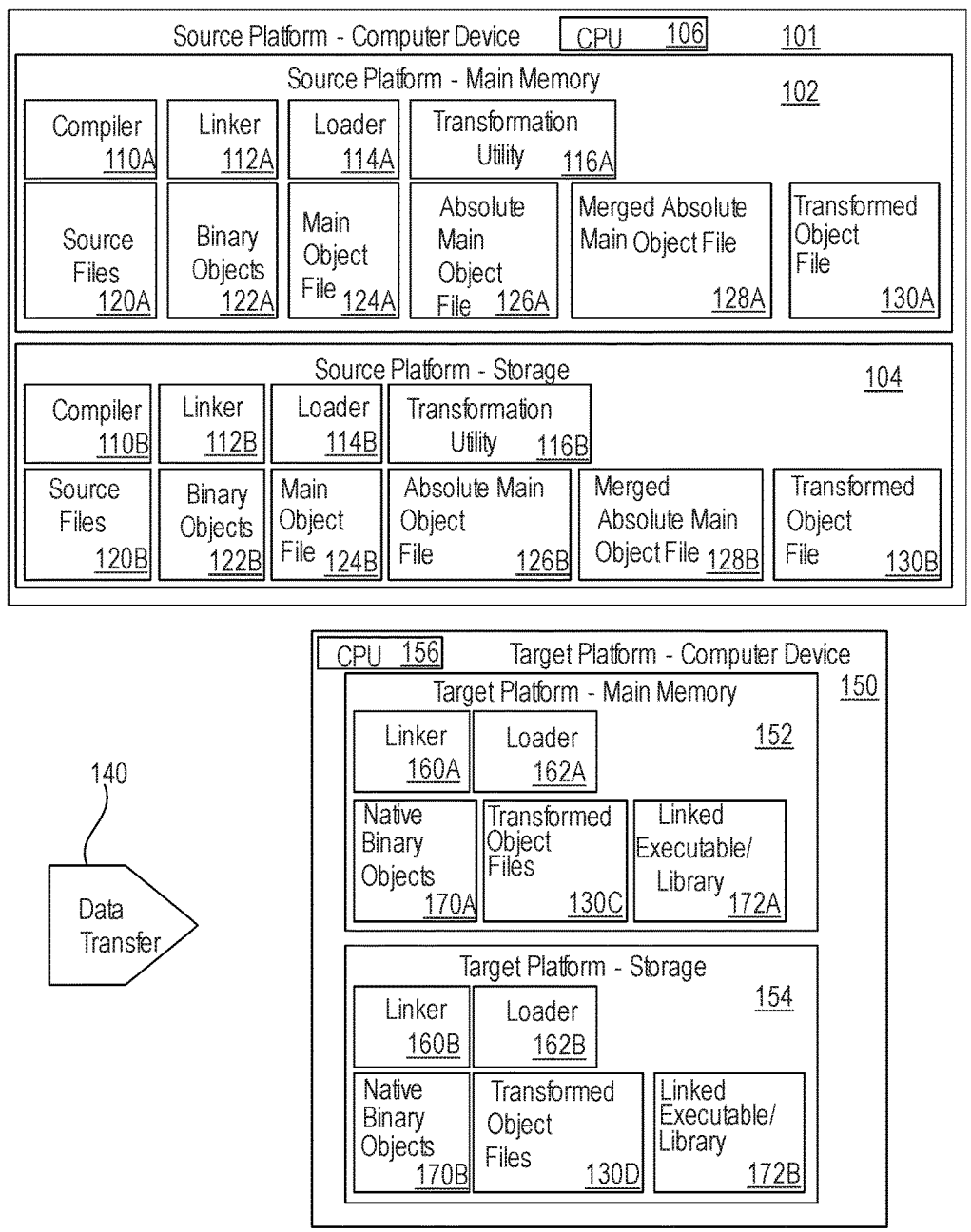
FIG. 1 is a schematic drawing of an exemplary computer system configured for performing the method according to embodiments of the invention.

A shared library is provided as a source object file which complies with the application binary interface (ABI) of an operating system (OS) running on a first computer system. The shared library may be deployed on a second computer system running on the same instruction set architecture (ISA) as the first computer system. The ABI of the OS running on the second computer system (herein called "target ABI" or "deployment ABI") may be incompatible with the ABI of the OS running on the first computer system (herein called "source ABI" or "development ABI"), and may be unsupportive of a software development environment which may be required to compile the source code of the shared library as a target object file that complies with the target ABI. Therefore, there is a need for a solution which may enable developing the shared library on the first computer system and making it useable on the second computer system.

A promising approach may be to transform the source object file into the target object file according to embodiments of the present invention. Embodiments of the invention may have the advantage of enabling the development of the shared library on an up-to-date system which is fully supportive of the most recent development environment including compilers, source code managers, and/or loaders for current object file formats such as GOFF and/or ELF. At the same time, it may be possible to keep the established software infrastructure provided by the target operating system for which the software is being developed. This may reduce the need for significant investments in updates and/or enhancements of the target system in order to support a modern software development environment. Furthermore, it may be beneficial, especially for newly hired development staff, if there is no need to fully comprehend the details of the target system in order to develop the software library using a familiar and up-to-date development environment on a modern computer system. In particular, a modern software development environment may leverage well-known open source solutions which may not have been available at the time when the target operating system came to market, but at which a large number of developers are proficient today.

A platform ABI may define the layout and metadata of binary object formats that are used by further applications or OS services. These binary objects may contain, amongst other data, sections and segments that further contain executable machine code, binary data and constants, symbol information, relocation information, and other data. While the machine code, and binary data and constants may be considered the payload of the object, relocation information, symbols, segment, and section definitions may be part of the metadata that are required to load the payload into memory for execution, or to enable further transformation and use of these objects. The machine code and binary data and constants may be directly dependent on the processor architecture of the system and may be only loosely coupled to the used operation system by the calling convention defined in the ABI.

Symbols may describe locations or values within a binary object or the main memory that are significant for the execution or linkage of a binary object in some way. They may contain the address of a function, the address of a shared data area, or some other value defined by a linker, such as, e.g., the size of a function.

A relocation may be a feature of an object file that enables assigning a load address to a particular portion of object code. As used here, an absolute relocation may define the load address within a particular virtual address space defined for the object. A relative relocation, on the other hand, may be understood here as a load address definition relative to a given reference address within the virtual address space. As (target) operating systems may exist whose ABI does not support relative relocations, providing the source object file free from relative relocation information may be a prerequisite for successfully performing a transformation.

A relocation record may represent an instruction to a linker to replace a placeholder within the machine code or binary data with a relocation value that becomes known only at link time. This relocation value may be related to the address of a symbol. Relocations can be separated into two main groups: absolute relocations that may refer to the address of that symbol, and relative relocations that may refer to the distance between the address of the symbol and the placeholder address. The final value placed in the placeholder location may be modified in various ways, e.g., truncated or shifted to fit within a particular operand of a machine instruction, as defined by the processor architecture. The relocation record itself may be defined by the address of the placeholder to be modified, a symbol whose address is to be used to determine the relocation value, and a relocation type that identifies the specific operation to be performed when updating the placeholder (including whether the relocation is absolute or relative).

The typical binary objects can be separated into three main groups: relocatable objects, executable objects, and shared libraries.

Relocatable objects may be the direct output from a compiler or assembler. These objects may still contain all symbols and can contain various types of relocations. They are used to build a shared library or an executable object with the help of a linker. Their location in the later memory image may not be fixed.

Shared libraries may be objects built out of one or more relocatable objects that are used to provide functions and other features to executable objects. Their location in memory may not be fixed because they may be loaded into different positions in the virtual address space of a process executing an executable object. Due to their unpredictable memory location and their concurrent use of multiple executable objects, they may contain absolute relocations that are stored within a local memory area isolated for every executable object that uses them. This location may be called the Global Offset Table (GOT). The connection between the machine code and this GOT may be done by a procedure linkage table (PLT), a set of stubs that extract the relocation information from the GOT and executes the branch to the target location.

The term 'shared library' may be used here to denote any object file or object which has been compiled such that a GOT and a PLT are created. This may be done when compiling a shared library in the narrower sense, e.g., when creating an object which is intended to provide additional functionality to executable files or further shared object files at load time or run time. Hence, the present definition of a shared library may include shared library objects in the narrower sense as well as other objects compiled from source code which is originally intended for generating a different type of object (e.g., an executable object), but which is compiled in an analogous manner to what is normally done for compiling a shared library in the narrower sense. A shared library created this way may be free from relative relocations.

Executable objects may be objects that are intended for execution by an operation system. They may be built out of one or more relocatable objects with the help of a linker. Depending on the linker, they may contain all symbols or only the necessary undefined symbols to find the functions in shared libraries. Since executable objects may have a fixed location in memory, they may contain relative and absolute relocations.

The source operating system and the target operating system may feature different ABIs and may both be executable on the same predetermined instruction set architecture (ISA). In particular, source and target operating systems may be running on two physically separated computers, e.g., the source operating system running on a first computer comprising a first processor and a first memory, and the target operating system running on a second computer comprising a second processor and a second memory, where the first and second processor and the first and second memory, are not located within the same device.

On the other hand, it may also be possible that the source and target operating system are two different virtual machines running on the same hardware, e.g., share the same processor and the same memory of one computer. Naturally, the computer system may be a hybrid implementation of the two described scenarios, e.g., the source and target operating systems being two virtual machines running on two different processors or cores of one processor, but sharing one instance of memory on a given computer.

A binary object may be regarded compliant with a given ABI if all data types stored in the object comply with the ABI's requirements and are structured and arranged in the object file as required by the ABI for the object layout. Different operating systems may come with incompatible ABIs, e.g., the ABIs differ in their required data types and/or object layouts. More specifically, a binary object may contain binary data and metadata. While the ABI may define the data types for the environment as well, embodiments of the invention may concern the structure and the layout of the metadata in the object.

The method may comprise the step of writing the target object file. It may be understood that the writing may be performed such that the target object file may be compliant to the target ABI.

Due to potential differences in ABI, transferring one object from one OS into another OS that is running on the same architecture may not be possible, because the metadata contained in the binary object may not be readable by the target OS, even if the machine code could be executed. Some operating systems may not support widespread types of binary objects, especially the concept of a shared library may be unsupported.

Additionally, depending on the ABIs used by these operating systems, the feature set of these ABIs might differ significantly such that even a conversion is not possible because relocation types may not exist on both OSs. However, it may be possible to produce or compile binary objects using advanced compiler or toolchains on one OS, in order to use them on a different OS where these capabilities do not exist. For example, code may be developed on Linux on z to be deployed on CMS and z/VM, where only limited compiler support exists.

The present disclosure describes an approach to solve the mismatch between different ABIs with significant differences in their feature set and capabilities by reducing the complexity of relocatable objects by transforming them into very closely defined objects that contains a minimum of relocations with the help of a shared library transformation. This shared library is then further transformed to meet the requirements of a minimum ABI that enables the transformation of objects into objects for a target ABI.

Embodiments may have the advantage to enable using the toolchain and development environment on one environment to write software which can be transformed in a way that makes it usable on a different platform with the same machine architecture. In an example, code is developed in C/C++ for z/VM, which in turn is mainly written in Assembler and provides no contemporary toolchain and compiler support for C or C++.

According to embodiments, the method further comprises generating the source object file, the generating comprising:
compiling a source code of the shared library to generate at least one binary object file, the compilation comprising creating a global offset table and a procedure linkage table for each of the at least one binary object file;
combining the at least one binary object file into one main object file, the combination comprising combining the at least one global offset table into a main global offset table and combining the at least one procedure linkage table into a main procedure linkage table; and
transforming any relative relocation information comprised by the main object file into absolute relocation information to convert the main object file into the source object file.

This may have the advantage of enabling the transformation of software which is not intended to serve as a shared library on the target system. If the source code is available, it may be possible to apply the transformation by compiling the source code in the same way as if it were a shared library. This may be accomplished by running the compiler with suitable options, in particular options for creating a GOT and PLTs for the object file(s) generated by the compiler.

According to embodiments, the method may further comprise, in case that the target application binary interface is unsupportive of a code element comprised by the source code, outputting an error message and aborting the transformation.

Not all language features may be supported by the target ABI. For example, the source code may be compliant to the C11 standard and use the storage-class specifier _Thread_local, which may not be supported by target system CMS. If an unsupported code element is detected, it may be advantageous to abort the transformation and use the error message to inform the developer about the unsupported language element. This may give the developer the opportunity to replace the unsupported language element in the source code to obtain a fully transformable object.

Unsupported code elements may occur, for example, when the software is written using a language revision which is younger than the target ABI, e.g., the unsupported code element contains a relatively new language feature which is not essential for the performance of the software. Hence, it may be possible to obtain a transformable object with minor amendments to the source code, e.g., by omitting a declaration which uses the unsupported language element, if the software also works without that declaration. In the example of _Thread_local, this would mean obtaining transformability at the cost of slightly reduced multithreading support, while the functionality of the software is not affected.

According to embodiments, the compilation comprises generating position independent code and/or symbols with private default visibility. Generating position independent code may have the advantage of the resulting main object file being free from relative relocations, such that no further conversion from relative to absolute relocations may be necessary. Enabling private default visibility may be beneficial to minimize the size of the public namespace, which may reduce the need for symbol transformation.

According to embodiments, the compiler used for the compilation may be a C language compiler. According to embodiments, the compiler may be supportive of at least the C89, C99, or C11 language standard. Using a C compiler may be beneficial, as C is supported by a large number of (target) operating systems and provides a comprehensive combination of language means, compiler functionalities, and varieties which may maximize the possibilities to control the transformation.

According to embodiments, the source object file may be structured into at least two segments, at least two memory image segments of the at least two segments comprising data of the source memory image, the target application binary interface requiring the target memory image to be structured as a single segment, the method further comprising merging the target memory image at least from the at least two memory image segments. This may advantageously enable applying the transformation also for target systems which do not support a segmented and/or discontinuous memory image.

According to embodiments, each of the at least two memory image segments may have assigned a first set of allowed access operations on the respective memory image segment, the merging comprising defining a second set of allowed access operations on the target memory image, the second set being the set union of the at least two first sets.

This may have the advantage that all access operations which are allowed for a given segment of the source object file are also allowed for the corresponding merged segment of the target object file. For example, a target segment is merged from one source segment with read-only access allowed and another segment with read and write access allowed. The set union of allowed access rights then comprises the elements "read" and "write," so all elements stored in the merged segment would have both read and write access allowed.

According to embodiments, the merging may further comprise omitting a given segment from the target memory image if the given segment is not necessary for the target memory image. According to embodiments, the merging may comprise, for a given segment:

if the given segment is a memory image segment, appending the given segment to the target memory image; and if the given segment is not a memory image segment, buffering any relocations and any symbols comprised by the segment for subsequent incorporation into the target object file, wherein the given segment is not necessary for the target memory image if the given segment is not a memory image segment and comprises no relocations and no symbols.

Omitting unnecessary segments from the target object file may reduce the size of the target object file, which may have the beneficial effect of using the target memory more efficiently.

According to embodiments, the creation of the target symbol information may further comprise, for a given symbol comprised by the source symbol information, mapping an address information of the given symbol to a target symbol address space required by the target application binary interface. As source and target ABI may differ in their requirements regarding symbol addresses (e.g., address length and/or format), this may have the advantage of yielding target symbol addresses which are compliant to the target ABI.

According to embodiments, the method may further comprise, in cases where the target symbol information exceeds the capacity of the target symbol address space, splitting the shared library into at least two volumes, where the splitting may be performed such that the target symbol information comprised by each of the at least two volumes does not exceed the capacity of the target symbol address space, wherein the creation of the target object header, the creation of the target memory image, the creation of the target symbol information, the creation of the target relocation information, and the writing are performed separately for each of the at least two volumes to yield a volume target object file for each of the at least two volumes.

This may provide compliance of the target symbol information to the target ABI for each volume thus created. It may still be possible to create a single target object file at a later point by linking the volumes using a linker application of the target platform.

According to embodiments, the source application binary interface may require all characters of source symbol names of the source symbol information to be taken from a source character set, and the target application binary interface may require all characters of target symbol names of the target symbol information to be taken from a target character set, where the creation of the target symbol information may further comprise performing a name translation for any given source symbol name with public visibility, the name translation comprising:

if automatic name mangling is enabled and if the given symbol name is not a reserved name, applying the automatic name mangling function to the given symbol name;

if the source character set is not a subset of the target character set, subjecting the given symbol name to a character set conversion towards the target character set;

if the translated given symbol name is a valid target symbol name in the target application binary interface, storing the given source symbol name with the given target symbol name in a symbol dictionary; and if the translated given symbol name is not a valid target symbol name in the target application binary interface, outputting an error message and aborting the transformation.

This may have the advantage that name mangling may be applied to symbol names which are not protected, e.g., function names defined by the developer in contrast to protected function names specific to the used programming language or the source or target system. Restricting the transformation to symbols with public visibility may have the advantage of providing the target symbol information with a minimum amount of symbols, thus reducing the risk of overfilling the name space for the target symbols.

According to embodiments, the name translation may further comprise a hash function, and/or a truncation rule. Together with name mangling and character conversion, this may form a comprehensive tool set to perform symbol name transformation for a large number of target ABIs.

According to embodiments, the creation of the target relocation information may further comprise, for a given relocation comprised by the source relocation information, mapping a source relocation type of the given relocation to a target relocation type required by the target application binary interface.

The relocation type of a relocation may comprise properties such as being an absolute or a relative relocation and/or the address length used for expressing the relocation information. Source and target ABI may differ in their requirements regarding relocation types. Transforming the relocation type for each relocation may therefore be beneficial to obtain target relocation information which is compliant to the target ABI.

According to embodiments, the given relocation may point to a source relocation address, the mapping of the source relocation type comprising, in case that a source relocation address length of the source relocation address exceeds a largest supported target relocation address length of the target application binary interface, for the given relocation:

calculating a byte difference between the source relocation address length and the largest supported target relocation address length;

translating the source relocation address into a target relocation address;

zeroing a sequence of bytes in the target memory image, the sequence starting at the target relocation address, the length of the sequence being the byte difference; and incrementing the target relocation address by the byte difference.

This may advantageously provide the capability to accurately track the effect of address length reduction on the memory image and the address value itself.

According to embodiments, the predetermined instruction set architecture may be the z/Architecture. According to embodiments, the source operating system may be a Linux on z System, the target operating system being z/VM. The z/Architecture may beneficially provide comprehensive support for the shared library transformation, such that no changes to the source code, compiler, linker and/or the target system may be necessary.

FIG. 1 shows a box model of an exemplary computer system 100 comprising a source computer 101 and a target computer 150. The source computer 101 is hosting a source platform on which the software to be transformed for deployment on the target computer is developed. The target computer 150 is hosting a target platform on which a transformed object file 130C/130D of the software developed on the source platform can be deployed.

The source computer 101 comprises a volatile main memory 102 and a non-volatile storage medium 104. The source computer 101 is capable of exchanging information (including, but not limited to, program instructions and binary data) between the main memory 102 and the storage medium 104. The source computer 101 further comprises a CPU 106 capable of executing instructions stored within the main memory 102. The memory 102 and storage 104 of the source computer 101 may include executable software, including compilers 110A/110B, linkers 112A/112B, loaders 114A/114B, and transformation utilities 116A/116B. In embodiments, compilers 110A/110B may be the same compiler in active memory and storage, respectively. In embodiments, linkers 112A/112B may be the same linker in active memory and storage, respectively. In embodiments, loaders 114A/114B may be the same loader in active memory and storage, respectively. In embodiments, transformation utilities 116A/116B may be the same transformation utility in active memory and storage, respectively.

The compilers 110A/110B may be any compiler capable of generating binary objects 122A/112B from corresponding source code files 120A/120B. In a typical example, the compiler is selected from the C family, and more specifically, a compiler compliant to the C11 standard (ISO/IEC 9899:2011). The linkers 112A/112B may be capable of combining binary objects 122A/122B into a single main object files 124A/124B. The loaders 114A/114B may be capable of loading a main object files 124A/124B into the main memory 102, including the task of relocating memory addresses. Relocation capability may also be a function of the linkers 112A/112B, to provide relocation at link time.

The transformation utilities 116A/116B may be one or more software programs implementing the method disclosed herein for transforming absolute main object files 126A/126B, which may be free from relative relocations, into transformed object files 130A/130B which comply with the application binary interface (ABI) of the target platform provided by the target computer 150. If provided by the compilers 110A/110B and/or linkers 112A/112B, the main object files 124A/124B can be generated from the sources 120A/120B as absolute main object files 126A/126B. This may be achieved if the compilers 110A/110B are further capable of generating a global offset table (GOT) and one or more procedure linkage tables (PLTs), which can be used by the linkers to generate the main object files 124A/124B as absolute main object files 126A/126B, directly. However, scenarios may occur where the compilers 110A/110B and/or the linkers 112A/112B are unsupportive of such capability, or the sources 120A/120B are not available. In these or similar cases, the transformation utilities 116A/116B may include one or more linker scripts to be executed by linkers 112A/112B for converting main object files 124A/124B, including relative relocations into the absolute main object files 126A/126B. Alternatively, relocation transformation may be implemented as a module incorporated by an executable of the transformation utilities 116A/116B.

The transformation utilities 116A/116B may also include functionality for merging segments of the absolute main object files 126A/126B to generate merged absolute main object files 128A/128B, including merged segments as required by the target ABI. For example, the target ABI may require the target memory image to be continuous, while the source binary objects 122A/122B may include a source memory image which is split into discontinuous segments which are distributed throughout the source object files. In this example, the merging capability of the transformation utilities 116A/116B may scan the source image file for memory image segments and copy them into a merged, continuous target memory image. The merging capability may include further functions, such as merging the memory image segments in a particular order required by the target ABI.

Besides the source memory image, the absolute main object files 126A/126B, which is also called source object file, may further include at least source symbol information and source relocation information, each of which may be transformed by a suitable capability of the transformation utilities 116A/116B. For example, the transformation utilities 116A/116B may convert the symbol length from a source length of 1,024 characters to a target length of 8 characters and the relocations from a 64-bit address space to a 32-bit address space. Additionally, the transformation utilities 116A/116B may be capable of creating a target object header comprising metadata descriptive of the target object file or transformed object files 130A/130B. The metadata may be copied or converted from source object header information which may be present in the source object file, but it may also include information which becomes available only at the time of generating the target object file, such as its size in bytes. Altogether, the transformation utilities 116A/116B may transform the absolute main object files 126A/126B or, respectively, the merged absolute main object files 128A/128B into transformed object files 130A/130B, which may include the target object header, the target memory image, the target symbol information and the target relocation information in the object file format required by the target ABI.

The transformed objects 130A/130B are transferred 140 to the target computer 150 using, e.g., a wired or wireless connection or a storage medium where they may become transformed objects 130C/130D. The target computer 150 comprises volatile main memory 152, a non-volatile storage medium 154, and a second processor 156. The memory 152, 154 of the target computer 150 may include linkers 160A/160B, capable of linking the transformed object file(s) 130C/130D, and optionally additional native binary objects 170A/170B to generate linked executables or libraries 172A/172B, which can be loaded into the main memory 152 by loaders 162A/162B for execution and/or further processing by the processor 156. The transformed object files 130C/130D and the native binary objects 170A/170B are compliant to the target ABI comprised by the target platform.

Figure 2:
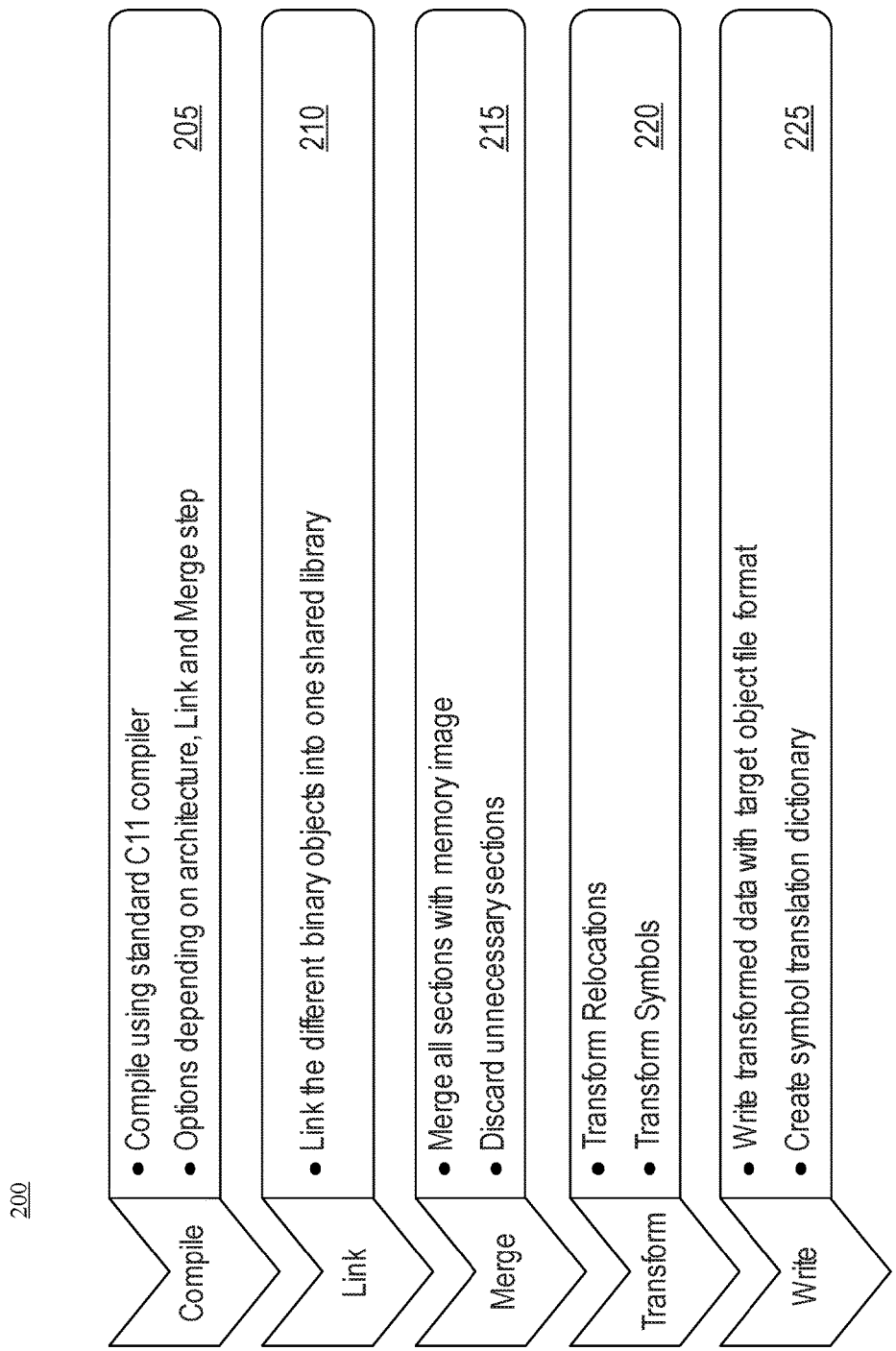
FIG. 2 illustrates the method according to an exemplary embodiment.

FIG. 2 visualizes a workflow 200 for transforming a shared library between two given exemplary platforms. At 205, a standard C11 compiler is used to compile the source code of the software to be deployed on the target system. Regardless of whether the software is intended to be deployed as an executable object, a library, or any other target format which can be used on the target system, the compiler is configured to treat the source code as a shared library, generating one or more binary objects alongside with a GOT and PLTs. The entire source code remains unaltered, and further compiler options are set as usual to reflect details of the architecture, the linking step and/or further desired traits of the resulting object files. Further compiler options may be set to prepare and/or configure the merging step, if necessary, and/or peculiarities of the linking steps which are necessary to create a shared library.

At 210, the standard linker is used to link the different binary objects into one shared library. During this step the linker combines the binary object files into a single main object file and transforms the main object file into an absolute main object file which is free from relative relocations.

At 215, the segments of the memory image of the absolute main object file are merged into a continuous memory image. This may be done by the linker by passing a linker script to the linker, or alternatively, a merging function of the transformation utility may be used to convert the segmented memory image into a continuous memory image. The merging step may be performed at link time or subsequent to the generation of the absolute main object file.

In the example shown in FIG. 2, the merging step (e.g., step 215) may also comprise the step of discarding unnecessary segments. This capability may be used to reduce the size of the memory image by leaving out, e.g., all segments which contain neither memory image data nor any symbol or relocation information.

At 220, the relocations and symbols comprised by the absolute main object file are transformed to fulfill the specifications of the target ABI. This may include, without limitation, mapping types, names and/or address spaces of the source information to the relocation types, naming conventions and/or address spaces required by the target ABI. In some cases, a suitable feature of the target ABI may be selected to avoid or minimize conversion effort.

At 225, the transformed memory image data, symbol information and relocation information are written to the target object file following the format and/or layout specifications of the target ABI. A target object header is generated for and included with the target object file. A symbol translation dictionary may be created in addition.

Figure 3:
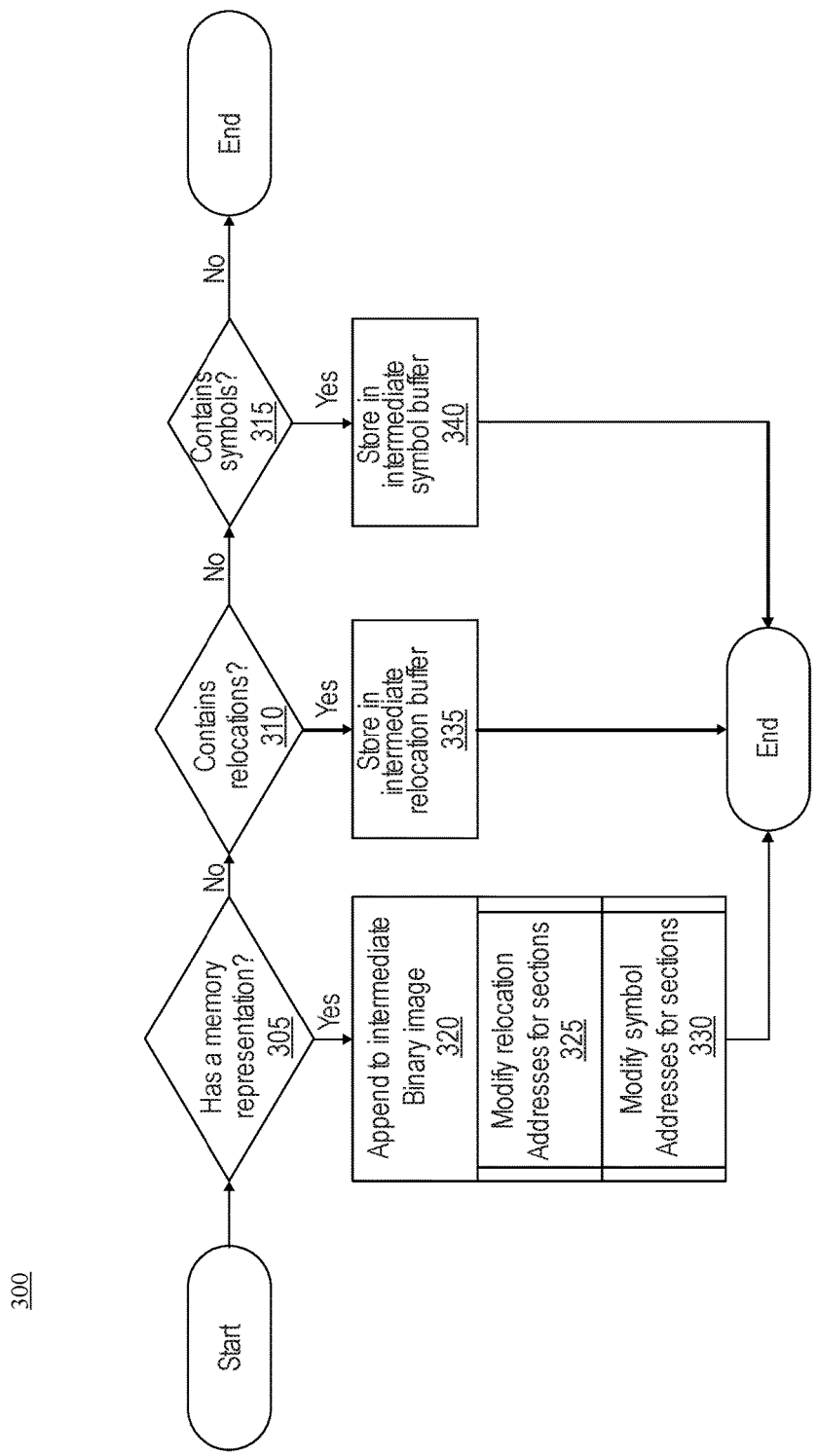
FIG. 3 is a flow diagram illustrating merging of object file segments according to an exemplary embodiment.

The flow diagram of FIG. 3 visualizes an exemplary workflow 300 for performing the merging of memory image segments of the source object file to provide a continuous target memory image for the target object file. The exemplary merging process of FIG. 3 walks through the object file segments to append all memory image segments of the source image file to an intermediate binary image to be presented as the continuous target memory image upon completion of the merging, buffers all segments containing relocations and/or symbols, and discards any other segments as they contain no useful information for the target memory image and/or the target object file.

For each visited segment, it is first checked whether the current segment comprises a representation of memory image data at 305. If this is true, the current segment is appended to the intermediate binary image at 320. Optionally, a preemptive modification of relocation addresses and/or symbol addresses can be performed for the given segment at 325 and 330, respectively. In case the given segment contains no memory representation, it is checked whether the given segment contains any relocation information at 310. If this is true, the given segment is stored in an intermediate relocation buffer at 335 for getting revisited during the transform step at a later point of the transformation procedure. If the given segment contains no relocations, it is checked whether it contains any symbol information at 315. If this is true, the given segment is stored in an intermediate symbol buffer at 340, in analogy to the case when the given segment contains relocation information. If all of the three checks yield a negative return, the given segment is discarded from the target object file as it apparently contains no useful information for constructing the target object file.

Figure 4:
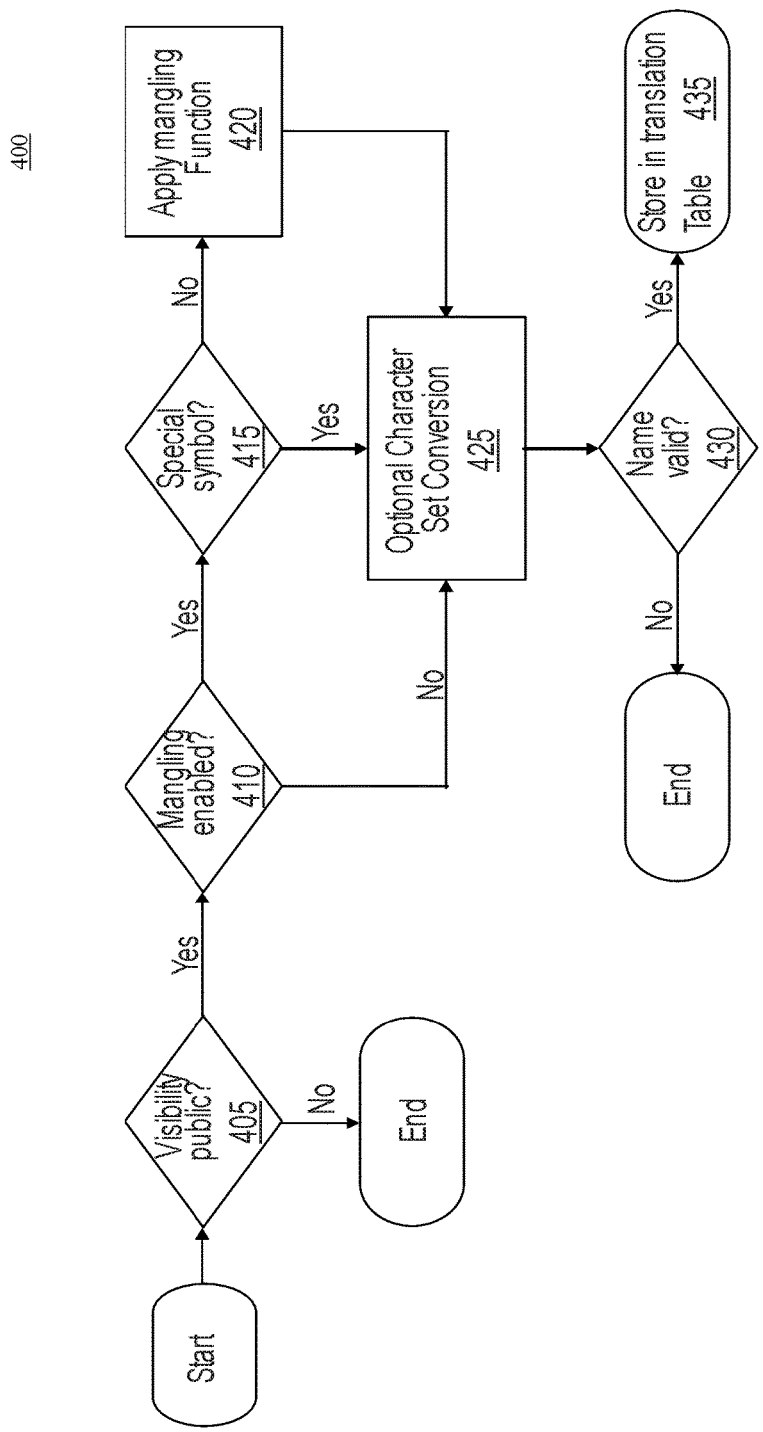
FIG. 4 is a flow diagram illustrating symbol transformation according to an exemplary embodiment.

FIG. 4 shows a flow diagram 400 visualizing an exemplary symbol transformation routine. For each symbol comprised by the source symbol information, it is first checked whether public visibility is given at 405. The routine discards all private symbols from the target object file to keep the global name space as clean as possible. Then, if automatic name mangling is enabled at 410, it is determined whether special symbols (e.g., reserved symbols for which special requirements may apply in the target ABI) are present at 415. At 420, the mangling function is applied to all symbols which are not a reserved symbol for which special requirements may apply in the target ABI. If necessary, a character set conversion can be applied to all public symbols at 425 (after the mangling, where applicable).

In the example shown in FIG. 4, a source symbol must be represented by a target symbol with a valid name according to validity requirements of the target ABI for reserved symbols. If the previous translation steps of FIG. 4 result in a valid translated name at 430, the original name is stored in a symbol dictionary together with the translated name at 435. However, in the rare case that a valid name mapping is impossible, the transformation cannot be continued with an unresolved name conflict. In this case, the transformation is therefore aborted and e.g. an error message is cast.

Figure 5:
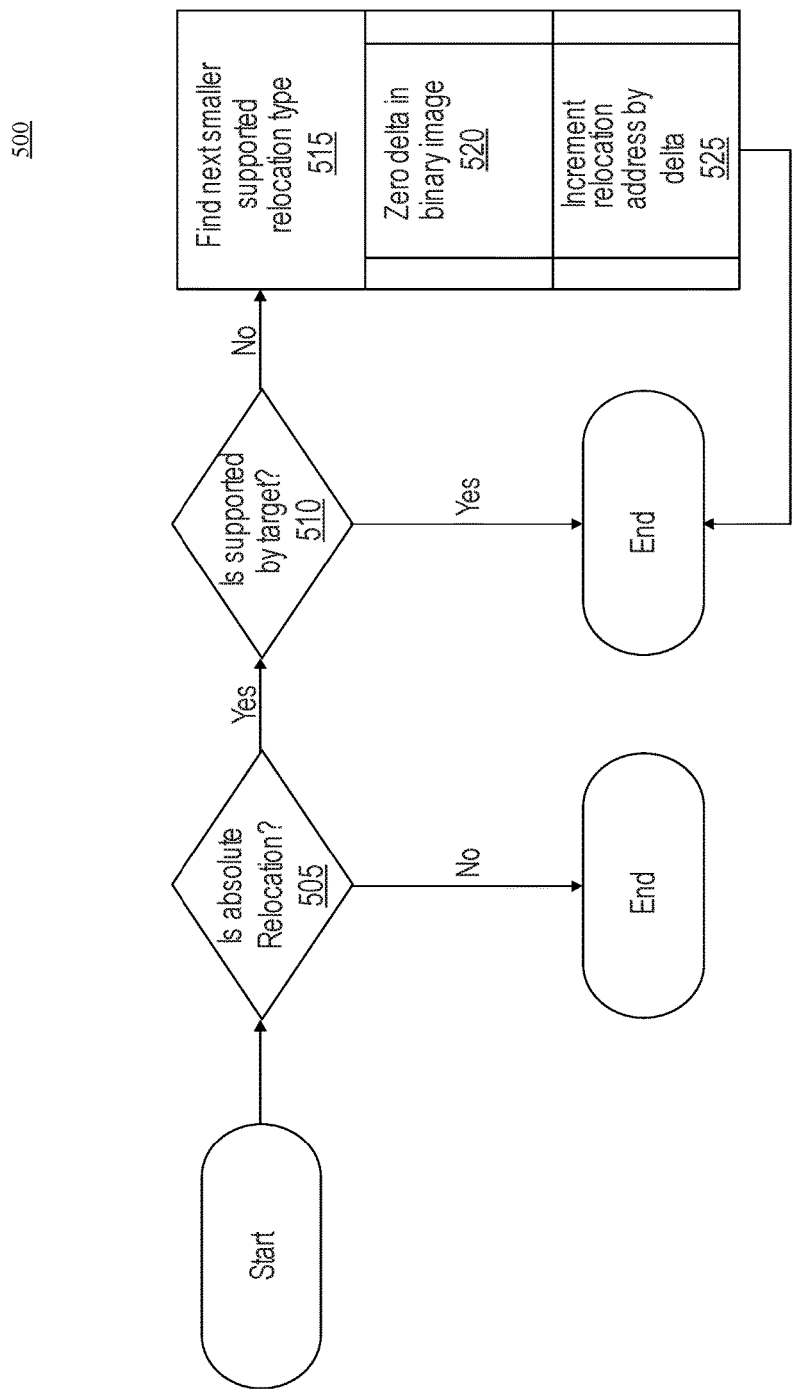
FIG. 5 is a flow diagram illustrating relocation transformation according to an exemplary embodiment.

Now turning to FIG. 5, a flow diagram 500 representing an exemplary relocation transformation is shown. In the example shown, the target ABI is unsupportive of relative relocations. As the input source object file is required to be free from relative relocations, the routine checks first, at 505, for each relocation comprised by the source relocation information, whether the given relocation is an absolute relocation. If a relative relocation is found, the transformation is aborted and e.g. an error message is surfaced.

For a given absolute relocation, it is then checked if all properties of the relocation type are supported by the target ABI at 510. For example, if no transformation is needed, the routine continues with the next relocation. If a mismatch is found, however, the relocation must be mapped to the target relocation type which is closest to the type of the source relocation. In the example shown, it is anticipated for the given exemplary combination of operating systems that the source relocation address length exceeds the largest supported target relocation address length of the target application binary interface. In a specific example, the source relocation has an address width of 64 bit, while the largest relocation address width supported by the target ABI is 32 bit.

If it is determined that the target ABI does not support one or more properties of the relocation type, the given source relocation is mapped to a target relocation using the next smaller supported relocation length at 515. First, the relocation type is changed to indicate the selected target relocation length. However, the address length transformation is not finished doing so, as the address length change also affects the exact target position of the relocation in the memory image. To account for this effect, the byte difference between the source relocation address length and the selected target relocation address length is calculated. Then, the routine sets a sequence of bytes in the target memory image to zero at 520, wherein the sequence starts at the target relocation address and extends over the calculated byte difference. The operation is finished by incrementing the target relocation address by the calculated byte difference at 525.

Figure 6:
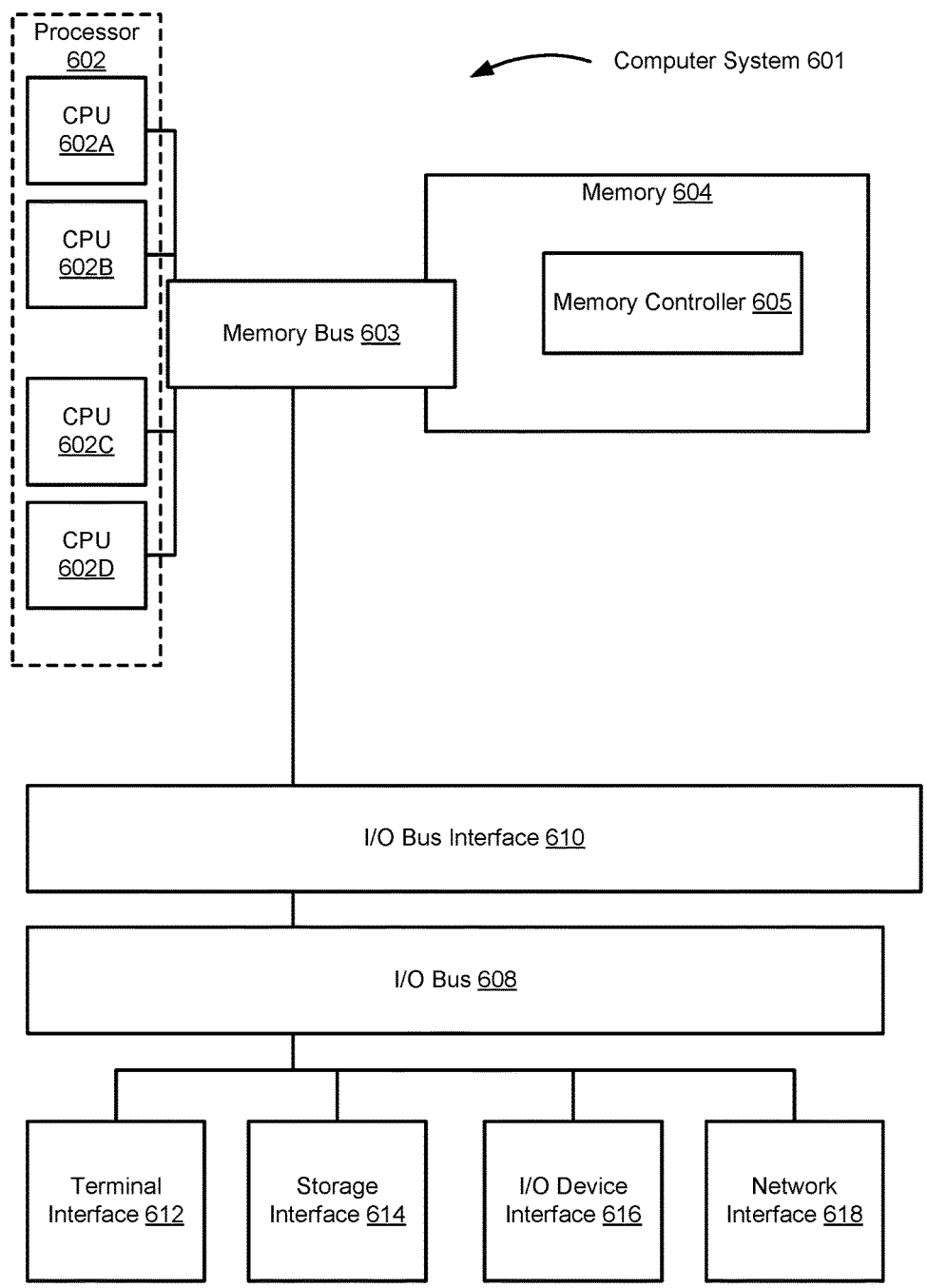
FIG. 6 illustrates a high-level block diagram of an example computer system that may be used in implementing embodiments of the present disclosure.

Referring now to FIG. 6, shown is a high-level block diagram of an example computer system (i.e., computer) 601 that may be configured to perform various aspects of the present disclosure, including, for example, methods 200/300/400/500, described in FIGS. 2-5, respectively. The example computer system 601 may be used in implementing one or more of the methods or modules, and any related functions or operations, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transforming a shared library from a source operating system to a target operating system, the source operating system comprising a source application binary interface and being executable on a predetermined instruction set architecture, the target operating system comprising a target application binary interface and being executable on the predetermined instruction set architecture, the target application binary interface being different from the source application binary interface, the shared library being implemented by a source object file, the source object file being compliant with the source application binary interface and comprising at least a source memory image, source symbol information, and source relocation information, the source relocation information being free from relative relocation information, the method comprising:

creating a target object header, the target object header being compliant to the target application binary interface and comprising information descriptive of the shared library and a target object file to be generated by the transformation;

creating a target memory image, the target memory image being compliant to the target application binary interface and comprising memory image data sourced from the source memory image;

creating target symbol information, the target symbol information being compliant to the target application binary interface and being sourced from the source symbol information;

creating target relocation information, the target relocation information being compliant to the target application binary interface and being sourced from the source relocation information; and writing the target object header, the target memory image, the target symbol information, and the target relocation information to the target object file to implement the transformed shared library by the target object file.

2. The method of claim 1, further comprising generating the source object file, the generating comprising:

compiling a source code of the shared library to generate at least one binary object file, the compilation comprising creating a global offset table and a procedure linkage table for each of the at least one binary object file;

combining the at least one binary object file into one main object file, the combination comprising combining the at least one global offset table into a main global offset table and combining the at least one procedure linkage table into a main procedure linkage table; and transforming any relative relocation information comprised by the main object file into absolute relocation information to convert the main object file into the source object file.

3. The method of claim 2, further comprising:

determining that the target application binary interface is unsupportive of a code element comprised by the source code; and outputting an error message and aborting the transformation.

4. The method of claim 2, wherein the compiling further comprises generating position independent code and symbols with private default visibility.

5. The method of claim 2, wherein the compiler used for the compilation includes a C language compiler.

6. The method of claim 5, wherein the compiler includes support for at least the C89, C99, or C11 language standard.

7. The method of claim 1, wherein the source object file is structured into at least two segments, wherein at least two memory image segments of the at least two segments comprise data of the source memory image, wherein the target application binary interface requires the target memory image to be structured as a single segment, and wherein the method further comprises merging the target memory image from the at least two memory image segments.

8. The method of claim 7, wherein the at least two memory image segments are assigned a first set of allowed access operations on the respective memory image segments, wherein the merging comprises defining a second set of allowed access operations on the target memory image, wherein the second set includes a set union of the at least two first sets.

9. The method of claim 7, wherein the merging further comprises omitting a given segment from the target memory image, in response to determining that the given segment is not necessary for the target memory image.

10. The method of claim 9, wherein the merging for the given segment comprises:

in response to determining the given segment is a memory image segment, appending the given segment to the target memory image.

11. The method of claim 1, wherein the creation of the target symbol information further comprises, for a given symbol comprised by the source symbol information, mapping address information of the given symbol to a target symbol address space required by the target application binary interface.

12. The method of claim 11, further comprising, in response to determining that the target symbol information exceeds the capacity of the target symbol address space, splitting the shared library into at least two volumes, the splitting being performed such that the target symbol information comprised by each of the at least two volumes does not exceed the capacity of the target symbol address space, wherein the creation of the target object header, the creation of the target memory image, the creation of the target symbol information, the creation of the target relocation information, and the writing are performed separately for each of the at least two volumes to yield a volume target object file for each of the at least two volumes.

13. The method of claim 1, wherein the source application binary interface requires all characters of source symbol names of the source symbol information to be taken from a source character set, wherein the target application binary interface requires all characters of target symbol names of the target symbol information to be taken from a target character set, wherein the creation of the target symbol information further comprises performing a name translation for any given source symbol name with public visibility, the name translation comprising:

in response to determining that the source character set is not a subset of the target character set, subjecting the given symbol name to a character set conversion towards the target character set;

in response to determining that translated given symbol name is a valid target symbol name in the target application binary interface, storing the given source symbol name with the given target symbol name in a symbol dictionary; and in response to determining that the translated given symbol name is not a valid target symbol name in the target application binary interface, outputting an error message and aborting the transformation.

14. The method of claim 13, wherein the name translation further comprises a hash function and a truncation rule.

15. The method of claim 1, wherein the creation of the target relocation information further comprises, for a given relocation comprised by the source relocation information, mapping a source relocation type of the given relocation to a target relocation type required by the target application binary interface.

16. The method of claim 15, wherein the given relocation points to a source relocation address, wherein the mapping of the source relocation type comprises, in response to determining that a source relocation address length of the source relocation address exceeds a largest supported target relocation address length of the target application binary interface, for the given relocation:

calculating a byte difference between the source relocation address length and the largest supported target relocation address length;

translating the source relocation address into a target relocation address;

zeroing a sequence of bytes in the target memory image, the sequence starting at the target relocation address, the length of the sequence being the byte difference; and incrementing the target relocation address by the byte difference.

17. The method of claim 1, wherein the predetermined instruction set architecture is a z/Architecture.

18. The method of claim 17, wherein the source operating system is Linux on z System, and wherein the target operating system is z/VM.

19. A computer program product for transforming a shared library from a source operating system to a target operating system, the source operating system comprising a source application binary interface and being executable on a predetermined instruction set architecture, the target operating system comprising a target application binary interface and being executable on the predetermined instruction set architecture, the target application binary interface being different from the source application binary interface, the shared library being implemented by a source object file, the source object file being compliant with the source application binary interface and comprising at least a source memory image, source symbol information, and source relocation information, the source relocation information being free from relative relocation information, the computer program product comprising a computer readable storage medium having program instructions embodied therewith, the program instructions being executable by a processor of a computer system to cause the computer system to perform a method comprising:

creating a target object header, the target object header being compliant to the target application binary interface and comprising information descriptive of the shared library and a target object file to be generated by the transformation;

creating a target memory image, the target memory image being compliant to the target application binary interface and comprising memory image data sourced from the source memory image;

creating target symbol information, the target symbol information being compliant to the target application binary interface and being sourced from the source symbol information;

creating target relocation information, the target relocation information being compliant to the target application binary interface and being sourced from the source relocation information; and writing the target object header, the target memory image, the target symbol information, and the target relocation information to the target object file to implement the transformed shared library by the target object file.

20. A computer system for transforming a shared library from a source operating system to a target operating system, the system comprising a first computer and a second computer, the first computer comprising a first processor and a first memory, the first processor comprising an instruction set architecture, the first memory being operatively coupled to the first processor and having the source operating system embodied therewith for execution of the source operating system by the first processor, the second computer comprising a second processor and a second memory, the second processor comprising the instruction set architecture, the second memory being operatively coupled to the second processor and having the target operating system embodied therewith for execution of the target operating system by the second processor, the source operating system comprising a source application binary interface, the target operating system comprising a target application binary interface, the target application binary interface being different from the source application binary interface, the shared library being implemented by a source object file, the source object file being embodied with the first memory and being compliant with the source application binary interface and comprising at least a source memory image, source symbol information, and source relocation information, the source relocation information being free from relative relocation information, the first memory further having program instructions embodied therewith, the program instructions being executable by the first processor to cause the first computer system to perform a method comprising:

creating a target object header, the target object header being compliant to the target application binary interface and comprising information descriptive of the shared library and a target object file to be generated by the transformation;

creating a target memory image, the target memory image being compliant to the target application binary interface and comprising memory image data sourced from the source memory image;

creating target symbol information, the target symbol information being compliant to the target application binary interface and being sourced from the source symbol information;

creating target relocation information, the target relocation information being compliant to the target application binary interface and being sourced from the source relocation information; and writing the target object header, the target memory image, the target symbol information, and the target relocation information to the target object file to implement the transformed shared library by the target object file.

\* \* \* \* \*